April 26, 1960  H. A. CHAPMAN ET AL  2,934,106
SAW BAND GUIDE
Filed Jan. 9, 1958  4 Sheets-Sheet 1

Inventors.
Harvey A. Chapman
Charles H. Whitmore
Robert L. Crane
By  Attorney

April 26, 1960  H. A. CHAPMAN ET AL  2,934,106
SAW BAND GUIDE

Filed Jan. 9, 1958  4 Sheets-Sheet 2

Inventors
Harvey A. Chapman
Charles H. Whitmore
Robert L. Crane

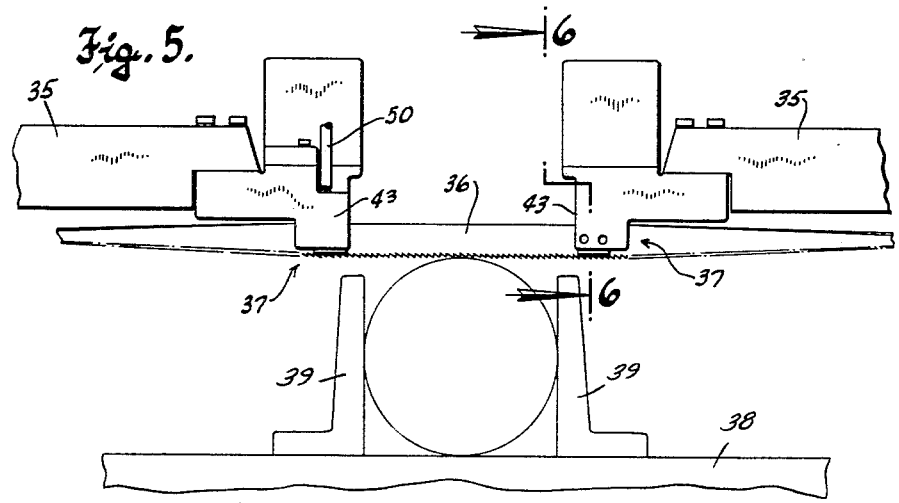
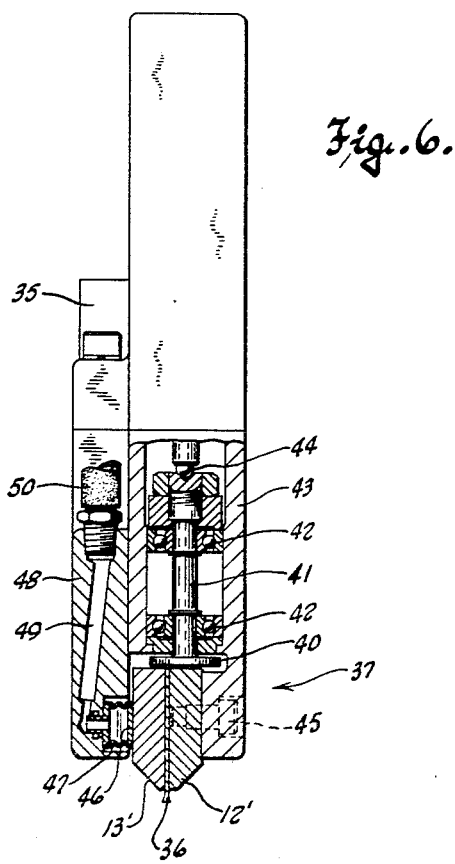

Inventors
Harvey A. Chapman
Charles H. Whitmore
Robert L. Crane
By
Attorney

United States Patent Office 2,934,106
Patented Apr. 26, 1960

2,934,106

SAW BAND GUIDE

Harvey A. Chapman and Charles H. Whitmore, Minneapolis, and Robert L. Crane, Hopkins, Minn., assignors to Continental Machines, Inc., Savage, Minn., a corporation of Minnesota Application January 9, 1958, Serial No. 707,967

6 Claims. (Cl. 143—160)

This invention relates to power tools of the type having an endless cutting band and, hence, usually referred to as band saws; and has as its purpose to provide improved guide means for the cutting or saw bands of such machines.

In power tools of the type to which this invention relates, an endless saw band is trained over a pair of pulleys and one straight stretch of the band traverses a cutting zone in which the work to be cut is positioned. For maximum cutting accuracy, the stretch of band passing through the cutting zone should be firmly held against both edgewise and sideward displacement, and to this end machines of the type here under consideration are provided with saw band back-up and guide means against which the back edge of the band and its side faces, respectively, are slidingly engaged. Conventionally, the back-up and guide means are provided at opposite ends of the cutting zone, so that they will not interfere with relative edgewise travel of the saw band through the work.

Heretofore, the saw band guides employed in band saws and cut-off saws to prevent sideward motion of the band have usually comprised fixed opposed shoes having flat surfaces which engaged the side faces of the band as it traveled lengthwise between them. While such guides were reasonably satisfactory for ordinary cut-off and sawing work, they could not guide the band with the accuracy required for finer machining operations because a saw band inevitably has slight variations in thickness along its length. If the spacing between the guide shoes was adjusted to the maximum thickness of the band, then as the thinner portions of the band passed between the shoes the band would not be firmly held against sideward movement or vibration, while adjustment of the shoes to the minimum band thickness caused noticeable binding of the band as its localized areas of greater thickness traversed the gap between the shoes, resulting in variations of the linear speed of the band.

With the foregoing in mind, it is an object of this invention to provide guide means for the saw band of a band saw, cut-off saw or the like, which comprises a pair of opposing guide members or shoes having surfaces which slidingly engage the opposite faces of the band, wherein the spacing between the shoes is constantly and automatically adjusted to accommodate variations in thickness of the band as it passes between the shoes, thereby insuring that both shoes will at all times have guiding engagement with the side surfaces of the band, to afford optimum cutting accuracy without causing variations in the linear speed of the band.

The guide means of this invention provides such accurate guidance to a saw band that a machine tool of the character described may be used for machining operations heretofore reserved for milling machines; and it is thus another object of this invention to provide such close and accurate guidance for a saw band in a power tool of the character described that the utility and versatility of the tool is greatly increased, enabling it to be used for operations heretofore reserved for performance by other more expensive machine tools.

More specifically, it is another object of this invention to provide an attachment for band saws whereby the saw band of such a machine is guided through the cutting zone with such accuracy and precision that the tool may be adapted for use in close tolerance machining operations, such as the cutting of the vane receiving slots in the rotors of pumps and fluid motors, as well as for ordinary sawing and cutting operations.

In cut-off saws, wherein the pulleys which carry the band lie in a plane which is more vertical than horizontal (axes approaching horizontal) the cutting stretch of the band must be twisted so that it is disposed in a vertical plane as it passes through the cutting zone, and it is held twisted in this manner by pairs of guide shoes located at the ends of the cutting zone. For best results, each pair of guide shoes must engage the faces of the band with substantial pressure, but it has been found that the operators of cut-off saws are very reluctant to adjust the guide shoes into sufficiently tight engagement with the band to obtain best results, probably because they fear that they will tighten the shoes excessively and cause them to gall or bind the saw band.

It is therefore another object of this invention to provide means in a cut-off saw or the like for automatically maintaining the guide shoes for the saw band in snug sliding engagement with the band, to thereby assure optimum results without any necessity for manual adjustment.

It is another object of this invention to provide guide means for the saw band of a power tool of the character described, comprising a pair of opposed guide shoes having surfaces which engage opposite sides of the band, one of which shoes is fixed and the other of which is biased toward the first to firmly confine the cutting stretch of the saw band against sideward motion, and wherein the biasing force on said other guide shoe may be readily released to facilitate installation or removal of the saw band.

Still another object of this invention resides in the provision of saw band guide means of the character described comprising a pair of guide shoes having opposing substantially flat faces which slidingly engage the side surfaces of the band, at least one of which shoes is mounted for limited rocking motion to enable it to accommodate itself to slight irregularities in the surface of the band which engages it.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate three complete examples of the physical embodiment of the invention constructed according to the best modes so far devised for the practical application of the principles thereof, and in which:

Figure 5 is a front elevational view of a cut-off saw embodying a modified version of this invention;

Figure 6 is a sectional view taken on the plane of the line 6—6 in Figure 5;

Figure 1:
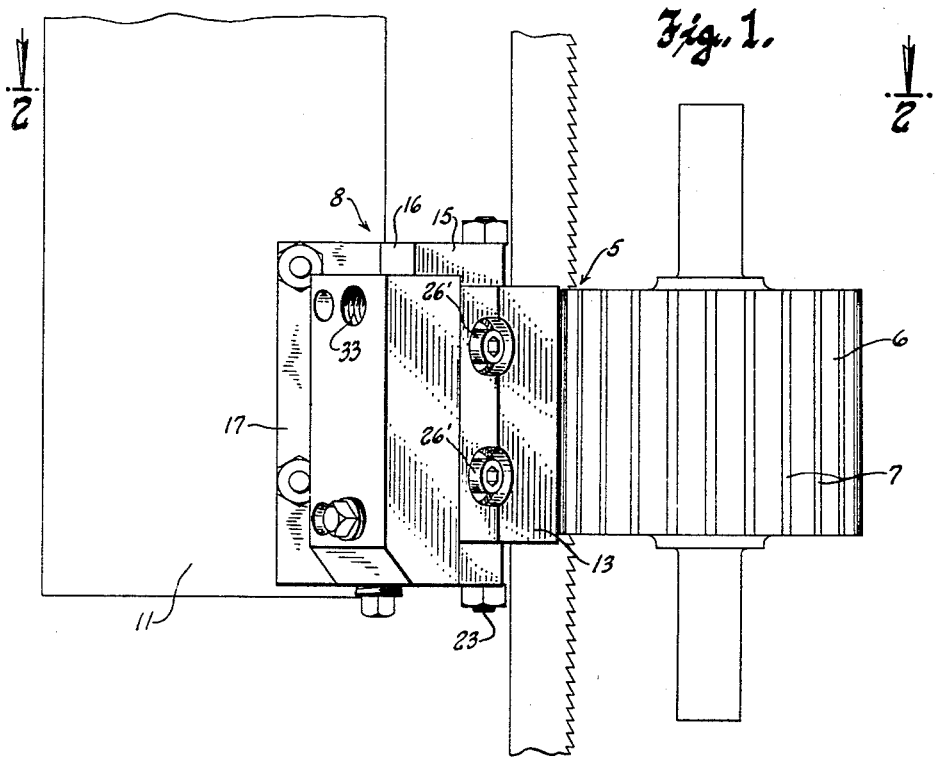
Figure 1 is a fragmentary side elevational view of the mechanism at the cutting zone of a band saw embodying the principles of this invention, the machine being shown in use to cut slots in the rotor of a fluid motor.
Figure 2:
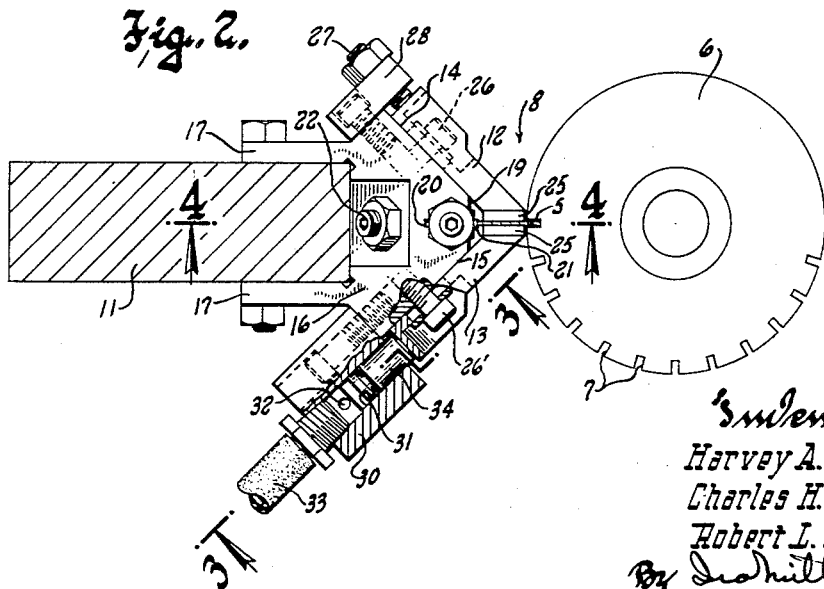
Figure 2 is a horizontal sectional view through Figure 1, on the plane of the line 2—2, with portions broken away and shown in section.
Figure 3:
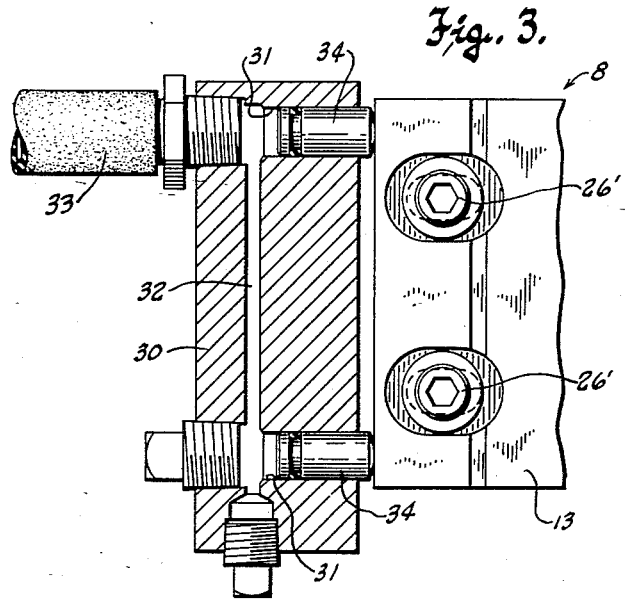
Figure 3 is a vertical sectional view taken on the plane of the line 3—3 in Figure 2.
Figure 4:
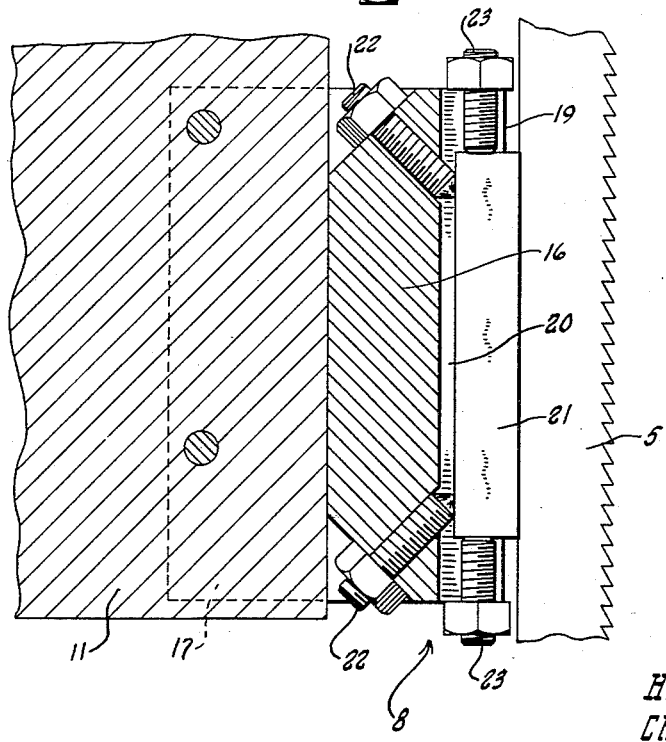
Figure 4 is a vertical sectional view taken on the plane of the line 4—4 in Figure 2.

Referring now to the accompanying drawings, in which like numerals designate like parts throughout the several views the numeral 5 designates the cutting stretch of a saw band of a band sawing machine which may be of any generally conventional type, such as that shown in the patent to L. A. Wilkie, No. 2,311,426. As is well known, the saw band is drivingly trained around a pair of pulleys (not shown) and at the straight stretch thereof which traverses the work or cutting zone a piece of work 6 may be brought into cutting engagement with the saw band. In the embodiment of the invention illustrated in Figures 1 through 4, the band sawing machine is shown being used for cutting radially outwardly opening slots 7 at spaced intervals around the periphery of a rotor, such as might be employed in a pump or fluid motor, and the guide means of this invention, designated generally by 8, engages the saw band in the cutting zone to confine it to strictly linear motion through said zone.

Since the cut being made in this case extends only a short distance into the work, the saw band may be supported in the work performing zone to obtain the optimum guidance and support for the band. To so support the band, the vertically adjustable post 11 upon which the guide means 8 is mounted is lowered to bring the guide means directly opposite the work.

The guide means comprises a pair of guide members 12 and 13, respectively mounted upon opposite sides 14 and 15 of a block-like body 16 which is fixed to the post 11. Any suitable means may be employed to secure the body to the post. For instance, the body may have rearwardly extending flanges 17 which embrace the post 11 and are bolted or otherwise secured thereto; and to provide maximum clearance for the work, the sides 14 and 15 of the body upon which the guide members are mounted, slant obliquely rearwardly and, between them, define an angle which is bisected by the vertical plane of the adjacent portions of the saw band.

The front of the block 16 which forms the junction between its angularly disposed sides 14 and 15, provides a relatively narrow flat front edge 19. A slot 20 extends into the block from this narrow front edge, and mounted in the slot is an insert 21 of hard wear resistant material. The insert 21 provides the back-up for the saw band and, hence, has its front edge portion disposed to be slidingly engaged by the back edge of the saw band, as clearly shown in Figure 4.

Accurate adjustment of the location of the back-up insert 21 is achieved through coaction between two pair of set screws 22 and 23 threaded into the mounting block 16 and bearing against the insert. The set screws 22 enter the block at an angle and have pointed ends bearing against the rear edge of the insert, and the set screws 23 have their inner ends bearing against the upper and lower ends of the insert, the tapped holes into which the set screws 23 are threaded being bisected by the slot 20.

The guide members 12 and 13 have their front end portions projecting beyond the narrow front edge 19 of the mounting block, and have saw engaging faces or surfaces on their outer ends to flatwise engage the opposite sides of the band and thereby hold the same against sideward displacement. If desired, the saw engaging portions of the guide members may be provided by shoes 25 of suitable wear-resisting material, fixedly secured to the guide members.

One of the guide members, namely, the guide member 12, is fixed to the mounting body 16 in a predetermined position of adjustment, and the other guide member is so mounted upon the body 16 as to enable the same to slide across the surface 15 to carry its saw engaging guide surface 25 toward and from that of the fixed guide member. The mounting for the fixed guide member 12 comprises a pair of cap screws 26 passed through elongated slots in the guide member and threaded into the mounting body 16. Set screws 27, threaded into an arm 28 fixed to the mounting body, provide means for adjusting the guide member 12 forwardly, it being understood that once the guide member 12 is adjusted to its proper position, the cap screws 26 are tightened down to lock the guide member in place.

The securement of the other guide member 13 to the mounting body 16 also utilizes cap screws 26′, passing through elongated slots in the guide member and threaded into the mounting body 16 but, in this instance, the cap screws are not pulled down tight, so that the guide member may be slid across the surface 15 toward and from the saw band. However, means are provided to at all times yieldingly urge the guide member 13 into firm engagement with the saw band.

Preferably, the means for biasing the guide member 13 towards the saw band utilizes hydraulic pressure. For this purpose, a cylinder block 30 is fixed to the body 16 behind the guide member 13, and in this cylinder block are two cylinders 31 communicated by a passage 32 and adapted to be connected to a source of hydraulic pressure (not shown) as by means of a suitable duct 33. Pistons 34 slidably received in the cylinders have their outer ends bearing against the rear of the guide member 13 to press the guide member against the saw band with a force depending upon the hydraulic pressure in the cylinders. Hence, if the guide member 12 has been properly positioned with respect to the specified location of the cut to be made in the work, the band will move through the work performing zone without the slightest wavering or vibration to assure the utmost accuracy in the size and location of the cut, despite the inevitable variations in thickness of the band. Also, since the guides are held together by fluid pressure, there are no noticable fluctuations in band speed such as occurred in the past where the new guides were set up tight in an effort to prevent sideward displacement of the band.

Although in the embodiment of the invention just described, the cutting stretch of the saw band travels vertically downward as it does in any conventional band saw, the novel guide means of this invention is also applicable to cut-off saws, such as that forming the subject matter of the copending application of Robert L. Crane et al., Serial No. 696,502, filed November 14, 1957. For such applications, the guide means, of course, would be duplicated at opposite sides of the working zone, as shown for instance in Figure 5. Here, the post 11 is supplanted by a pair of horizontally adjustable rigid arms 35 which extend inwardly toward the working zone from the opposite ends of the saw carrying frame (not shown) but which, as is well known, mounts the pulleys about which the saw band 36 is trained. The arms 35 are adjusted to locate the guide means, indicated generally in this instance by the numeral 37, in close juxtaposition to the opposite sides of the cutting zone, and the work to be cut is supported on a bed 38 and is gripped between a pair of vise jaws 39.

The guide means 37, in this embodiment of the invention, not only serves to guide the saw band through its work zone, but also twists the cutting stretch of the band to dispose the cutting portion thereof in a vertical plane. If desired, the guide means could be like that previously described and shown in Figures 1 to 4, inclusive; but, for this particular application, the guide means is preferably as shown in Figure 6.

In this case, the back up for the saw band is provided by a roller 40 carried by a shaft 41, which is freely rotatably mounted in bearings 42 mounted in a bracket 43 fixed to the arm 35. The upward thrust imposed upon the roller 40 is transferred to a thrust bearing 44 which in turn carries it into a hydraulic pressure applying means, not shown since it forms no part of this invention.

As before, a pair of fixed and yieldable guide members 12' and 13' grip the opposite sides of the saw band. The fixed guide member 12' is bolted to the mounting bracket, as at 45, and the yieldable guide member 13' is held in place by being secured to one end 46 of a Sylphon bellows 47. The bellows 47 are mounted in a pocket in the outer end of a block 48 fixed to the bracket and provided with a fluid pressure channel 49 leading to the interior of the bellows from an inlet port to which a hydraulic supply line 50 is connected. Accordingly, hydraulic pressure developed in the Sylphon bellows forces the guide member 13' toward the other guide member to clamp the saw band thereagainst. It is, of course, to be understood that the grip thus maintained upon the band is sufficient to hold its cutting stretch accurately and firmly in a true vertical plane throughout the entire cutting operation.

An advantage of this embodiment of the invention resides in the fact that the support for the guide member 13' enables it to more readily accommodate itself to the passage of localized areas of greater than normal thickness of the band. This advantage flows from the more or less floating support of the guide member afforded by the bellows and the fact that the point of pressure application on the guide member is substantially centrally located with respect to the area of its band engaging surface.

Figure 7:
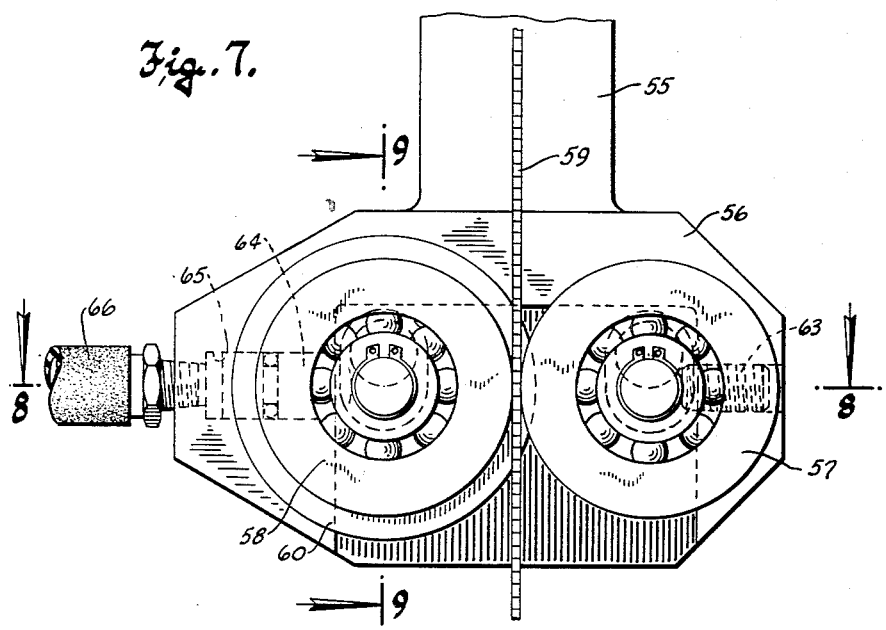
Figure 7 is a front view of a saw band guide of the type in which the band guiding members are rollers, and illustrating the application of this invention thereto.
Figure 8:
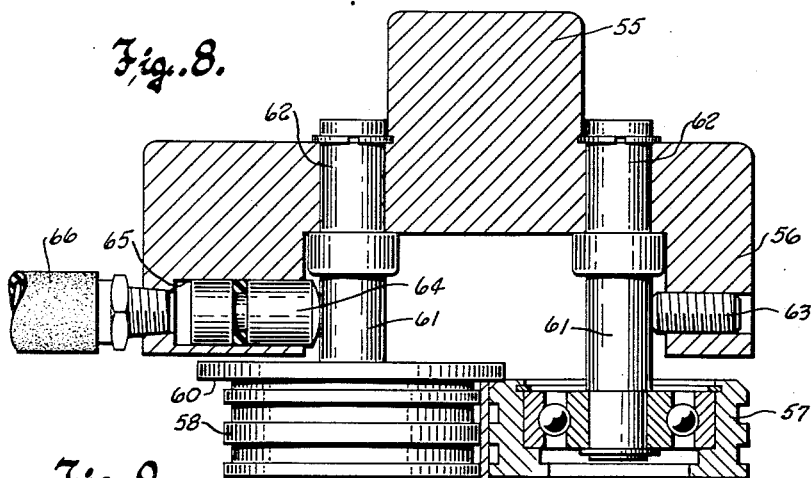
Figure 8 is a horizontal sectional view through Figure 7 on the plane of the line 8—8.
Figure 9:
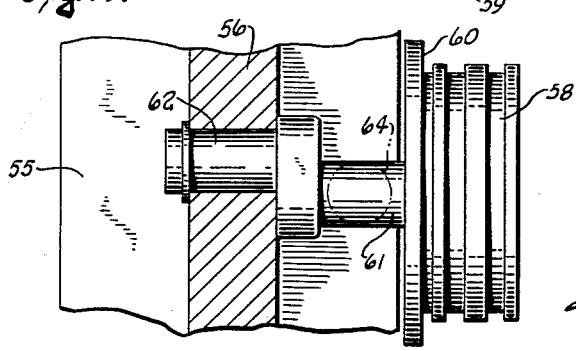
Figure 9 is a vertical sectional view through Figure 7 on the plane of the line 9—9.

As shown in Figures 7, 8 and 9, the invention is also applicable to saw band guides of the type wherein the guide members are freely rotatable rollers, as in Patent No. 2,601,095, issued to Robert L. Crane.

In this case, the vertically adjustable back-up post 55 carries a bracket 56 on its lower end, and freely rotatably mounted on this bracket is a guide roller 57 and a back-up roller 58. The axes of the two rollers are parallel and their cylindrical faces oppose one another to engage the opposite sides of the saw band 59 as it passes therebetween. A flange 60 on the back-up roller overlaps the back of the guide roller and supportingly engages the back edge of the saw band.

Each of the rollers is freely rotatably mounted on one end portion 61 of a crank-shaped stub shaft, the other end portion 62 of which is received in a shaft bore in the bracket. Hence, by rotation of the stub shafts about the axes of their mounted end portions 62, the rollers may be adjusted towards and from one another.

The portion 61 of the shaft of one of the rollers, in this case the guide roller 57, has an adjustable take-up screw 63 bearing thereon to enable this roller to be accurately brought to its correct position supportingly engaging the adjacent side of the saw band. The same portion of the shaft of the other roller has a pressure applying plunger or piston 64 bearing against it. This piston operates in a cylinder 65 in the bracket which is connected with a source of hydraulic pressure (not shown) by means of a suitable duct 66. Hence, the piston presses upon the roller shaft it engages and rotates the same in the direction to urge its roller towards the other with a force dependent upon the hydraulic pressure in the cylinder.

It should be understood that, following conventional practice, the entire saw band just described with reference to Figures 7, 8 and 9, which illustrate the upper guide, i.e. the guide which is located above the work supporting table of the machine to guide the band as it enters the work zone, is duplicated below the table. In operation, this form of the invention solidly supports the saw band and holds it against sideward vibration as it passes through the work zone in the same way as do the other described embodiments of the invention, but with the added advantage of allowing higher band speeds.

From the foregoing description, taken in connection with the accompanying drawings, it will be readily apparent to those skilled in this art, that this invention provides a saw guide for band saws and similar machine tools which far surpasses all guide means heretofore available for this purpose.

What is claimed as our invention is:

1. In a power sawing machine of the type having a saw band which moves endwise through a working zone, means for guiding and constraining the saw band to accurately defined movement through the working zone comprising: a pair of guide members having opposing band engaging faces between which the saw band travels; means fixedly mounting one of said guide members on the machine adjacent to the working zone of the machine and in a position to have one side of the saw band move across its band engaging face; means mounting the other guide member for bodily movement toward and from said fixedly mounted guide member; an element movable in one direction in response to hydraulic pressure thereon; means for imposing hydraulic pressure from a source thereof upon said movable element; and means mounting said movable element in position to have said element transfer the hydraulic pressure thereon against said movably mounted guide member in the direction to force the same toward the fixed guide member and thereby clamp the saw band against the fixed guide member to thus hold the portion of the saw band passing between the guide members and the portions thereof adjacent to the guide members against sideward displacement, despite inevitable variations in the thickness of the saw band.

2. The structure of claim 1 wherein the movable element is one end of a Sylphon bellows, said end of the bellows bearing against the movably mounted pressure applying guide member and the other end of the bellows being fixedly supported, the interior of the bellows being connected with the source of hydraulic pressure.

3. The structure of claim 1, wherein the band engaging faces of the guide members are flat; and further characterized by the fact that said movable element exerts its pressure upon the movably mounted pressure applying guide member at a point substantially centrally located with respect to its flat band engaging face; and by the fact that the mounting of the pressure applying guide member allows the same to rock about the point of pressure application thereon by said element as localized areas of the saw band having greater than normal thickness pass between the guide members.

4. In a power sawing machine of the type having a saw band which moves endwise through a working zone, means for guiding and constraining the saw band to accurately defined movement through the working zone, comprising: a body having a narrow front edge and flat sides extending back from said front edge at an angle to one another; means mounting said body on the machine with its narrow front edge facing the back edge of the saw band and with the angle defined by the flat sides of the body bisected by the plane of the adjacent portion of the saw band; a first guide member having a flat band engaging surface; means fixing said first guide member to one flat side of the body with its flat band engaging surface slidingly engaging the adjacent side of the saw band; a second guide member having a flat band engaging surface; means mounting the second guide member on the other side of the body, with its band engaging surface opposite that of the first guide member to slidingly engage the other side of the saw band, said mounting means enabling the second guide member to move across the body in the direction to carry its band engaging surface towards and from the band engaging surface of the first guide member; a cylinder block fixed to the body behind the second guide member, having a cylinder opening towards and in line with the back of the second guide member; a piston in the cylinder bearing against the back of the second guide member; and means for connecting the cylinder with a source of fluid pressure to thereby effect fluid pressure produced movement of the band engaging surface of the second guide member towards that of the first guide member.

5. The structure of claim 4, further characterized by the fact that said body has a slot opening to its narrow front edge; and by the provision of a saw band back-up mounted in said slot and bearing against the back edge of the saw band.

6. In a power sawing machine of the type having a saw band, guide means for confining a stretch of the saw band to endwise movement through a cutting zone, said guide means comprising: a pair of guide members having opposing band engaging faces between which the saw band travels; mounting structure for the guide members, said mounting structure having spaced rigidly connected arms embracing the guide members; means fixedly securing one of said guide members to one of the arms; means carried by the other arm and supporting the other guide member for limited movement toward and from the first guide member; means interposed between said other arm and the movably mounted guide member for imposing yielding pressure upon said movably mounted guide member in the direction to urge said guide member towards the other so that the saw band is clamped between the guide members under yielding pressure, the mounting structure having a cavity opening to the space between its arms; and back-up means in said cavity bearing against the back edge of the saw band to support the same against the thrust of the work on the saw band.

References Cited in the file of this patent

UNITED STATES PATENTS

| | | |
|---|---|---|
| 1,593,436 | Causey | July 20, 1926 |
| 1,725,089 | Lemmer | Aug. 20, 1929 |
| 1,870,555 | Burton | Aug. 9, 1932 |
| 2,601,095 | Crane | June 17, 1952 |
| 2,684,697 | Ferrari | July 27, 1954 |
| 2,765,008 | Hankins | Oct. 2, 1956 |